United States Patent [19]

Koenig

[11] 4,009,240
[45] Feb. 22, 1977

[54] METHOD AND APPARATUS FOR PURIFYING BLISTER FURNACE EFFLUENT

[75] Inventor: Ralph A. Koenig, Tulsa, Okla.

[73] Assignee: John Zink Company, Tulsa, Okla.

[22] Filed: June 18, 1975

[21] Appl. No.: 587,957

[52] U.S. Cl. .......................... 423/210; 23/277 C; 75/74; 75/76; 266/147; 266/157
[51] Int. Cl.² ........................................ B01D 53/34
[58] Field of Search ................. 423/210, 247, 245; 23/277 C; 266/15, 16; 75/74, 76

[56] References Cited
UNITED STATES PATENTS

| | | | |
|---|---|---|---|
| 3,437,475 | 4/1969 | Themalis et al. ....................... | 75/76 |
| 3,806,583 | 4/1974 | Dewell ............................... | 423/210 |

Primary Examiner—Earl C. Thomas
Attorney, Agent, or Firm—Head, Johnson & Chafin

[57] ABSTRACT

A purifier for handling the high temperature effluent from a blister copper furnace, which includes solid particles in the range from 600 microns, or greater, down to a few microns, which contains oxidizable material, and which is at a high temperature, in the range of 2100° to 2400° F. The effluent from the blister furnace goes first to a settling chamber where the very large particles are caused to settle out by reducing the velocity of the effluent gas. The effluent then goes to a precooler tower which is an adiabatic humidifier, where the temperature is reduced to the neighborhood of 1200° F. by injecting an air-driven water atomizer spray. The effluent then goes to an oxidation tower where the combustibles are oxidized, at lower than flame temperature, by injecting air and recycled gas. The effluent then goes to a conditioning tower which is a second adiabatic humidifier to further cool the gases to the neighborhood of 450° F. From here they may go to a waste heat boiler or to a baghouse or other solid particle collector, and then to the stack.

6 Claims, 1 Drawing Figure

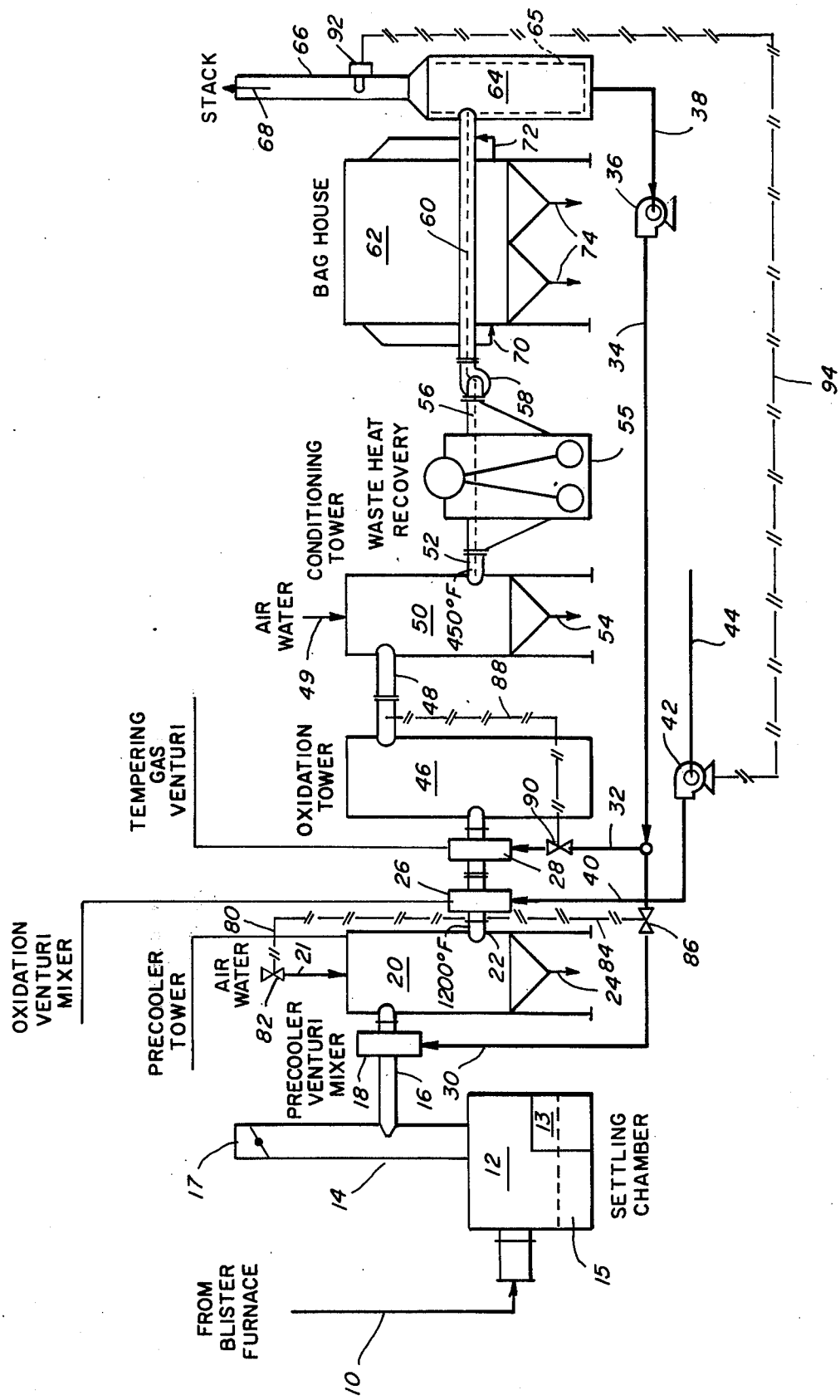

METHOD AND APPARATUS FOR PURIFYING BLISTER FURNACE EFFLUENT

BACKGROUND OF THE INVENTION

This invention lies in the field of exhaust gas purifiers, in general, and to a purifier for the effluent from a blister copper furnace, in particular.

Such effluent gases contain large quantities of oxidizable material, and large quantities of particulate matter, in the range in size of from a few microns up to 600 microns or more, and they are at high temperature, in the range of 2100° to 2400°.

Copper scrap including attendant foreign materials, such as plastic insulation, fibers and other metallic elements, is melted in a blister furnace. In the first cycle which is called the "charge and melt cycle," the furnace is charged with the copper scrap which forms a slag of debris, which is called scoria. This slag is removed by tilting the furnace and removing the floating scoria from the surface of the liquid copper. However, much of the scoria remains in particulate form in the effluent.

In the charge and melt cycle, oxidizing gases are passed through the molten copper in order to oxidize foreign metallic material, and cause them to form solid oxides in the scoria, or to be blown off as metallic vapors, etc. The oxidation is for the purpose of purifying the copper by removing foreign materials. However, there may be an excess of air, and consequently some oxidization of the copper to cupric oxide.

The next step of the operation is what is called the "poling cycle." This is the step of reducing the copper by injecting into the molten copper a reducing gas, such as hydrogen or carbon monoxide or ammonia or combinations of reduction gases. The amount and kind of gas is carefully controlled so as not to reduce the copper too far.

The volume of effluent during the charge and melt cycle is considerably greater than that during the poling cycle, and may be as much as five times more. This makes it difficult to control the throughput of the effluent in the treating apparatus, because of the different flow rates of effluent.

SUMMARY

The apparatus of this invention includes a number of separate towers and processing vessels, which provide:
  a. a step-by-step reduction in velocity of the effluent;
  b. a settling of particles due to the lower velocity of the effluent;
  c. a cooling and oxidizing so as to remove the oxidizable gases in the effluent, and to further reduce the temperature of the gases so that at the outlet of the final conditioning tower, the exit gases will be in the neighborhood of 450° F, and the only remaining solids will be of a size that can efficiently be removed by a filter system, and/or electrostatic precipitator. Thereafter the exhaust gases at about 450° F are directed into the atmosphere from a stack.

Part of the exit gases are recycled to the intermediate towers during the poling cycle, to increase the volume of effluent gases and, to provide inert gases to further cool and dilute the effluent, and permit more effective handling of the gases through the various towers. This hinders nitrogen fixation during oxidation of the combustibles in the gas stream.

If desired, the cooling in the conditioning tower may be reduced and the hot gases carried through a waste heat boiler, where they can be cooled to an exit temperature suitable for venting to the atmosphere, with resultant saving of useful heat.

BRIEF DESCRIPTION OF THE DRAWINGS

It is a primary object of this invention to provide an apparatus for the handling, control and processing of effluent gases from a blister copper furnace, to cool them, to oxidize the oxidizable material, and to remove particulate matter, before venting to the atmosphere.

This and other objects and advantages of this invention and a better understanding of the principles and details of the invention will be evident from the following description taken in conjunction with the appended drawing which shows in schematic block form the processing equipment, according to this invention.

DESCRIPTION OF THE PREFERRED EMBODIMENT

Referring now to the drawing, there is shown a line 10 which is an exhaust gas duct, which leaves the blister furnace, and which carries the effluent from the furnace into a settling chamber 12. Considering first the charge and melt cycle, off gas, or effluent gas, is drawn through the blister furnace exhaust gas treatment system by an induced draft fan 58. The gas is routed from the blister furnace through the exhaust gas duct 10 into the settling chamber 12. Here the bulk velocity of the gas is reduced below the terminal velocity of particulate matter, which may be present in the effluent, that has a diameter of 600 microns or greater. This particulate matter will be composed entirely of scoria that is blown over during the furnace operation. The larger particles of scoria 15 collect on the bottom of the settling chamber, and means are provided, including a large door 13, through which a small dozer vehicle can be driven into the chamber, and the scoria removed. During operation, of course, the door 13 is sealed, and the only outlet is through a vertical duct 14 which serves as the base for an emergency vent 17, in case the pressure in the system is too high to be safe for the equipment which follows. Because of the combustible nature of the hot gases, flare combustion apparatus must be provided at the emergency vent 17. However, this forms no part of the invention.

The exhaust from the settling chamber goes through line 16 to a precooler venturi mixer 18 which is used only in the boiling cycle, and will be described below. During the charge and melt cycle, where there is a large volume of effluent, it goes directly from the settling chamber into the precooler tower 20. Here a water atomizer spray driven by air, enters through line 21, and cools, slows down, and reduces the volume of the entering gases. At the reduced velocity there is further solids drop out which can be removed at the point 24. The cooling by evaporation of the water spray brings the temperature at the outlet 22, to the neighborhood of 1200° F.

The gases then pass through an oxidation venturi mixer 26 where they are mixed with air from a line 44 through blower 42 and line 40. They next pass through a temperature tempering gas venturi 28.

The mixing of air with the effluent gases at 1200° F, containing oxidizable gases, in venturi 26 causes immediate oxidation. In order to prevent the too rapid rise of temperature, recycled inert gas from the output stack 64 is brought through line 38, through blower 36 and lines 34 and 32 to mix with, and dilute, the output of the venturi mixer 26, as they pass into the oxidization tower 46. Here there is a nonflame oxidizing process, which increases the temperature of the gas and which then passes through the line 48 into a conditioning tower 50 into which an air-driven water spray is passed through line 49. There is further adiabatic humidifying and cooling of the gases. Normally the action in the conditioning tower 50 will reduce the temperature of the gases to the neighborhood of 450° F. at the outlet 52. Also because of the cooling there will be reduced velocity, and further solids will drop out, and can be removed at the point 54.

From the exit point 52 the gases may go by conduit indicated generally by the dashed line 56, 60 to a stack 64, and vent through the pipe 66 to the atmosphere, in accordance with arrows 68. However, an alternative manner of operation is to reduce the amount of cooling in the conditioning tower 50, and pass the gases from the tower 50 into a waste heat boiler 55, where there is heat exchange from the hot gases, so that waste heat steam may be obtained for use elsewhere in the plant operation.

Also after the gases are cooled, either in the conditioning tower, or the waste heat boiler 55, they may go to a particulate gathering apparatus such as a baghouse 62, which may also include an electrostatic percipitator (not shown). In other words, the effluent passing from the waste heat boiler may go by line 70 into the baghouse, and out of the baghouse by line 72 into the stack 64. Solids out of the baghouse are removed at points 74 as is well-known in the art. Blower 58 provides induced draft for the entire processing line.

The stack 64 is constructed of an inner chamber shown schematically by the dashed line 65 and an outer chamber with air insulation space therebetween. Thus, the temperature inside the stack 64 may be maintained at a temperature higher than the dewpoint temperature of sulfur trioxide. This improves the stack effluent appearance, and eliminates any requirement for external insulation of the stack.

Of the equipment illustrated in the FIGURE, certain parts, namely the precooler tower and the oxidizer tower, are not utilized in the poling cycle where there is less volume of effluent from the blister furnace. During the poling operation there is recycle of the inert stack gases by way of lines 38, blower 36 and lines 34, 30 and 32 to the precooler 20 and the temperature tempering gas venturi 28. Thus, a controlled amount of the inert stack gases, at low temperature, can be used to dilute the oxidizing material so as to reduce the temperature of the throughput, and minimize the requirement for air and water through the inputs 21 and 49. This has an important function of diluting the oxidizable materials (combustables) so as to reduce the oxidation rate and thereby retarding formation of undesirable nitrogen oxides (NOx) in the resultant effluent.

What has been described is a processing system which comprises a series of towers and chambers wherein the effluent from the blister furnace is successively reduced in velocity, and reduced in temperature, allowing particles to settle out, and wherein the effluent is oxidized to remove the oxidizable material, at lower than flame temperature, and finally wherein the temperature of the effluent is reduced to a safe temperature for particle separation, in the form of a baghouse or electrostatic precipitator. This provides an effluent gas which is free of oxidizable material, and all particulate matter down to the size desired.

TECHNICAL DATA

A. Charge and Melt Cycle

As examples of typical operating conditions, estimates have been made, which are summarized in the following tables:

1. System capacity

The system would be designed on the basis of waste gas streams of the following composition. Principle consideration is given to the flows in the Charge and Melt and the Poling cycles.

| | Blister Furnace Exhaust Gas | | | | |
|---|---|---|---|---|---|
| | Charge & Melt lb/hr | Skim lb/hr | Oxidizing lb/hr | Deoxidizing (Poling)lb/hr | Casting lb/hr |
| $CO_2$ | 11249 | 2896 | 2896 | 726 | 2896 |
| $N_2$ | 51140 | 2249 | 2249 | 4582 | 2249 |
| $H_2O$ | 9698 | 13551 | 13551 | 2701 | 13551 |
| $H_2$ | — | — | — | 254 | — |
| C | — | — | — | 1500 | — |
| $SO_2$ | — | — | 140 | — | — |
| Total | 74087 | 18696 | 18836 | 9763 | 18696 |

2. The gas composition after quenching in the Precooler Tower 20, is estimated to be:

| | lb/hr |
|---|---|
| $CO_2$ | 11249 |
| $N_2$ | 54468 |
| $H_2O$ | 27088 |
| $O_2$ | 400 |
| Total | 93205 |

Approximately 7 lb/hr of fume and scoria particulate will be entrained in the gas stream.

Temperature of gases leaving the Precooler Tower will be approximately 1200° F.

3. After the second quenching in the Conditioning Tower, the gas composition is estimated to be:

| | lb/hr |
|---|---|
| $CO_2$ | 11249 |
| $N_2$ | 55838 |
| $H_2O$ | 45000 |
| $O_2$ | 813 |
| Total | 112900 |

A maximum of 7 lb/hr particulate will be entrained in the gas stream. Temperature of gases leaving the Conditioning Tower: 450° F.

4. Gases leaving the particulate collector (baghouse) will be the same as in A3 above.

Particulate loading will be less than 1 lb/hr.

5. The plant effluent gases will be of the composition and flow rate as in A4 above.

B. Poling Cycle

1. The gas composition after the Precooler Tower is estimated to be:

|       | lb/hr |
|-------|-------|
| $CO_2$ | 2575 |
| $N_2$ | 11988 |
| $H_2O$ | 12841 |
| $H_2$ | 247 |
| Total | 27651 |

A maximum of 35 lb/hr fume and scoria particulate, and 1460 lb/hr free carbon will be entrained in the gas stream. Temperature of gases leaving Pre-Cooler Venturi Mixer: 1,200° F.

2. The gas composition after the Oxidation Venturi Mixer 26 is estimated to be:

|       | lb/hr |
|-------|-------|
| $CO_2$ | 7939 |
| $N_2$ | 31971 |
| $H_2O$ | 14996 |
| $O_2$ | 195 |
| Total | 55101 |

A maximum of 35 lb/hr fume and scoria particulate will be entrained in the gas stream.

3. The gas composition after the Tempering Gas Venturi Mixer 28 is estimated to be:

|       | lb/hr |
|-------|-------|
| $CO_2$ | 9819 |
| $N_2$ | 40068 |
| $H_2O$ | 25963 |
| $O_2$ | 406 |
| Total | 76256 |

A maximum of 35 lb/hr fume and scoria particulate will be entrained in the gas stream. Temperature of gases leaving the venturi mixer: 1,800° F.

4. The gases leaving the Conditioning Tower 50 are estimated to be:

|       | lb/hr |
|-------|-------|
| $CO_2$ | 9819 |
| $N_2$ | 42376 |
| $H_2O$ | 55985 |
| $O_2$ | 1098 |
| Total | 109278 |

A maximum of 35 lb/hr fume and scoria particulate will be entrained in the gas stream. Temperature of gases leaving the tower: 450° F.

5. The gas composition leaving the particulate collector (baghouse) will be the same as described in B4 above.

6. The solids flow from the particulate collector (baghouse) from the collector hoppers will be essentially the total solids entering the collector. The solids are composed of extremely fine particulate and are immersed in a vapor that is 65% water.

7. The composition of the gas stream leaving the system is estimated to be:

|       | lb/hr |
|-------|-------|
| $CO_2$ | 6225 |
| $N_2$ | 26870 |
| $H_2O$ | 34988 |
| $O_2$ | 692 |
| Total | 68775 |

Suitable controls include a temperature sensitive control line 80 from precooler outlet 22 and valve 82 to the air-water injection means to the precooler 20 and a temperature control line 84, from the outlet 22, and valve 86 to control line 84, from the outlet 22, and valve 86 to control the inert cooled gas line 30 from vent 66 during the poling cycle. Likewise, control line 88, from a temperature sensitive means in the outlet 48, from the oxidation tower controls inert gas via valve 90 during the poling cycle. An oxygen sensitive means 92 senses the $O_2$ content of the vent 66 which controls, via line 94, the air quantity to the oxidation venturi mixer 26 during the poling cycle.

While the invention has been described with a certain degree of particularity it is manifest that many changes may be made in the details of construction and the arrangement of components. It is understood that the invention is not to be limited to the specific embodiments set forth herein by way of exemplifying the invention, but the invention is to be limited only by the scope of the appended claim or claims, including the full range of equivalency to which each element or step thereof is entitled.

I claim:

1. A process for purifying the charge and melt cycle, and poling cycle effluent from a copper blister furnace, comprising the steps during said charge and melt cycle of:
    a. reducing the velocity of the effluent stream in a settling chamber so as to permit the larger particulate matter to drop out of the streams,
    b. cooling the effluent streams with air and water;
    c. thermally oxidizing with air the effluent stream at a temperature below the flame temperature,
    d. cooling the effluent stream after oxidation, and
    e. venting the cooled stream; and comprising the additional steps only during said poling cycle of:
    f. stopping the flow of air and water to said cooling step (b),
    g. recycling cooled gases from said venting to the input to said cooling step (b) as a function of the temperature of the outlet gases from said cooling step (b),
    h. recycling cooled gases from said venting to the input to said oxidizing step (c) as a function of the temperature of the outlet gases from said oxidizing step (c) and
    i. supplying air to the outlet gases from said cooling step (b) as a function of the oxygen content of the gases being vented.

2. The process as in claim 1, including:
    the step after step (d) and before step (e) of recovering waste heat in the effluent stream.

3. The process as in claim 1, including:

the step after step (d) and before step (e) of collecting particulate matter from the effluent stream.

4. The process as in clam 1, including the step of:
maintaining, during all cycles, the temperature of the outlet gases from said cooling step (b) at about 1,200° F.

5. The process as in claim 1 in which:
the cooling of said effluent gases in step (d) is to a temperature of about 450°.

6. The process as in claim 1 in which:
the cooling of said effluent gases in step (d) is by means of a water mist.

* * * * *